US010373196B2

(12) United States Patent
Ma et al.

(10) Patent No.: US 10,373,196 B2
(45) Date of Patent: Aug. 6, 2019

(54) METHOD AND SYSTEM FOR AD INSERTION IN OVER-THE-TOP LIVE MEDIA DELIVERY

(71) Applicant: Ericsson AB, Stockholm (SE)

(72) Inventors: Kevin J. Ma, Nashua, NH (US); Robert Hickey, Bedford, MA (US); Raj Nair, Lexington, MA (US); Paul Tweedale, Andover, MA (US); Daniel Biagini, Bolton, MA (US); Jianguo Xu, Newton, MA (US); Prabhudev Navali, Westford, MA (US)

(73) Assignee: ERICSSON AB, Stockholm (SE)

( * ) Notice: Subject to any disclaimer, the term of this patent is extended or adjusted under 35 U.S.C. 154(b) by 1201 days.

(21) Appl. No.: 14/168,734

(22) Filed: Jan. 30, 2014

(65) Prior Publication Data

US 2014/0150019 A1    May 29, 2014

Related U.S. Application Data

(63) Continuation of application No. PCT/US2013/048433, filed on Jun. 28, 2013.
(Continued)

(51) Int. Cl.
*H04N 21/266*       (2011.01)
*H04N 21/234*       (2011.01)
*G06Q 30/02*         (2012.01)
*H04N 21/2668*      (2011.01)
*H04N 21/462*       (2011.01)
(Continued)

(52) U.S. Cl.
CPC ..... *G06Q 30/0251* (2013.01); *G06Q 30/0277* (2013.01); *H04L 65/4084* (2013.01); *H04L 65/602* (2013.01); *H04N 21/2668* (2013.01); *H04N 21/26603* (2013.01); *H04N 21/44016* (2013.01); *H04N 21/458* (2013.01); *H04N 21/462* (2013.01); *H04N 21/6125* (2013.01); *H04N 21/812* (2013.01);
(Continued)

(58) Field of Classification Search
CPC ......... H04N 21/2668; H04N 21/23424; H04N 21/234309
See application file for complete search history.

(56) References Cited

U.S. PATENT DOCUMENTS 8,234,350 B1 * 7/2012 Gu ................. H04N 21/234309
                                                      709/203
8,973,032 B1    3/2015   Brueck et al.
(Continued)

FOREIGN PATENT DOCUMENTS

EP           2464133 A1     6/2012
WO     2010078539 A2     7/2010

*Primary Examiner* — Brian T Pendleton
*Assistant Examiner* — Frank Johnson

(57) ABSTRACT

A method is provided for performing targeted ad insertion in over-the-top delivery of content by detecting ad replacement opportunities in a live content stream and preparing the content for seamless replacement with segmented HTTP adaptive streaming delivery. The method includes provisions for multi-stage proxy-based segment replacement for targeted ad delivery. The method provided works transparently with standard HTTP adaptive streaming clients. A system is also specified for implementing a client and server content delivery infrastructure in accordance with the provisions of the method.

26 Claims, 8 Drawing Sheets

Related U.S. Application Data

(60) Provisional application No. 61/665,373, filed on Jun. 28, 2012.

(51) Int. Cl.

| | | |
|---|---|---|
| *H04N 21/81* | (2011.01) | |
| *H04N 21/44* | (2011.01) | |
| *H04N 21/458* | (2011.01) | |
| *H04N 21/61* | (2011.01) | |
| *H04N 21/8547* | (2011.01) | |
| *H04N 21/858* | (2011.01) | |
| *H04L 29/06* | (2006.01) | |

(52) U.S. Cl.
CPC ..... *H04N 21/8547* (2013.01); *H04N 21/8586* (2013.01); *H04N 21/23418* (2013.01)

(56) References Cited

U.S. PATENT DOCUMENTS

| | | |
|---|---|---|
| 9,066,115 B1 | 6/2015 | Cherry et al. |
| 9,066,138 B1* | 6/2015 | Kraiman ............. H04N 21/458 |
| 9,237,387 B2* | 1/2016 | Bocharov .......... H04N 21/4331 |
| 2010/0251278 A1 | 9/2010 | Agarwal et al. |
| 2010/0303447 A1 | 12/2010 | Niemeijer et al. |
| 2011/0161409 A1 | 6/2011 | Nair et al. |
| 2011/0246661 A1 | 10/2011 | Manzari et al. |
| 2011/0283010 A1 | 11/2011 | Parchman et al. |
| 2012/0042090 A1 | 2/2012 | Chen et al. |
| 2012/0047542 A1 | 2/2012 | Lewis et al. |
| 2012/0116883 A1 | 5/2012 | Asam et al. |
| 2012/0124618 A1 | 5/2012 | Ruiz-Velasco et al. |
| 2012/0137015 A1* | 5/2012 | Sun .................. H04N 21/26258 709/231 |
| 2012/0167132 A1* | 6/2012 | Mathews ......... H04N 21/25808 725/32 |
| 2012/0259946 A1 | 10/2012 | Stockhammer et al. |
| 2012/0304223 A1* | 11/2012 | Sargent ............ H04N 21/44016 725/32 |
| 2013/0246643 A1 | 9/2013 | Luby et al. |
| 2013/0282915 A1* | 10/2013 | Patel ....................... H04L 65/60 709/231 |
| 2014/0040026 A1* | 2/2014 | Swaminathan ........ G06Q 30/02 705/14.53 |
| 2014/0115625 A1* | 4/2014 | McCoy ............ H04N 21/23424 725/34 |

* cited by examiner

METHOD AND SYSTEM FOR AD INSERTION IN OVER-THE-TOP LIVE MEDIA DELIVERY

BACKGROUND

This invention relates in general to over-the-top (OTT) media delivery and more specifically to targeted advertisement replacement for near-real-time streaming media.

Near-real-time delivery protocols are popular for OTT media delivery due to their simplicity, their ability to adapt to varying network conditions through the use of rate adaptation, and the low cost of deployment using commodity HTTP delivery infrastructures. OTT media delivery typically relies on a segment-based retrieval paradigm using the HTTP protocol. HTTP adaptive streaming uses multiple encodings (each encoded at a different bitrate, resolution, and/or frame rate), allowing the client to select an appropriate encoding for its local network conditions. Manifest files are used to convey encoding information to clients. Manifest files are also used to indicate segment retrieval locations. For real-time (live) content, segments and manifest files are produced and retrieved by clients in real-time.

SUMMARY

One general aspect of media delivery, whether using traditional broadcast techniques or newer OTT techniques, is the need to insert advertisements into media being delivered to customers as part an ad-supported business model of operation. Traditional linear television typically inserts advertisements on a regional basis and then broadcasts the resultant stream to all viewers in the region. However, the unicast nature of HTTP-based delivery allows for more personalized advertisement delivery. Targeted advertisements in OTT delivery require alternate advertisement insertion paradigms.

Methods and apparatus are disclosed for performing targeted advertisement replacement in over-the-top (OTT) media delivery. A disclosed OTT delivery system includes a live stream processor, an HTTP client, and an ad segment proxy that collectively include a variety of mechanisms usable in different ways for ad replacement.

In one aspect, a method is provided for dynamically inserting advertisement metadata into segments and manifest files being generated in real-time, to enable targeted advertisement replacement. The method may be performed in part by a live stream processor used to create media segments for OTT delivery via a content delivery network (CDN). In one embodiment, the real-time input stream is a linear television feed. In one embodiment, the linear television feed contains cue tones which indicate upcoming advertisement pods (breaks), the start of each advertising pod, and the end of each advertisement pod. In one embodiment, the cue tones conform to the Society of Cable Telecommunications Engineers (SCTE) Digital Video Subcommittee SCTE-35 Digital Program Insertion Cueing Message for Cable specification. In one embodiment, the SCTE-35 program descriptors describe the structure (i.e., the number of advertisement and duration of each advertisement) of the advertisement pods. In another embodiment, callouts are used to determine the structure (i.e., the number of advertisement and duration of each advertisement) of the advertisement pods. In one embodiment, the callout messages conform to the Society of Cable Telecommunications Engineers (SCTE) Digital Video Subcommittee SCTE-130 Digital Program Insertion—Advertising Systems specification.

In another embodiment, advertising pods (breaks) are defined ahead of time and specified out-of-band using time markers (e.g., corresponding to wall clock time of broadcast or presentation time of MPEG-TS frames, or time offset from the beginning of the program). In one embodiment, the structure (i.e., the number of advertisement and duration of each advertisement) of the advertisement pods is also included with the out-of-band advertising pod offset information. In one embodiment, a Video Multiple Ad Playlist (VMAP) is used to specify the out-of-band advertising pod information. In another embodiment, a custom XML format is used to specify the out-of-band advertising pod information. There are numerous methods and protocols available for providing out-of-band advertising pod information as should be known to those skilled in the art. It should be understood that any such method would be suitable for use with the present invention.

Advertisement pod structures are used to define advertisement boundaries within the real-time stream. Segments are then created on advertisement boundaries and metadata is inserted into the segments and manifest files to indicate the beginning and end of advertisements. Metadata indicating upcoming advertisements is inserted into segments and manifest files leading up to the advertisement boundaries. In one embodiment, advertisement decision server, program identifier, and advertisement spot (placement) information is included in the metadata to enable clients and intermediaries to issue targeted ad placement requests.

In one embodiment, advertisement placement requests are issued to an advertisement decision server for one or more of the advertisement insertion opportunities specified in the advertisement pod. In one embodiment, the advertisement decision server also functions as an SCTE-130 server used to determine the advertisement pod structure. In one embodiment, the segments within the advertisement program boundaries generated from the real-time input stream are replaced with segments specified in the advertisement placement response. In one embodiment the replacement advertisement segments are downloaded to replace the actual segments. In another embodiment, the segment URLs associated with advertisements (i.e., segments within advertisement boundaries) are replaced in the manifest file with URLs pointing to the segments specified in the advertisement placement response. In another embodiment, the segment URLs associated with advertisements (i.e., segments within advertisement boundaries) are replaced in the manifest file with URLs pointing to an advertisement segment proxy server. In one embodiment, the advertisement proxy server URLs contain unique sequence numbers to enable identification and correlation of multiple segments from the same advertisement. In one embodiment, the advertisement proxy server URLs contain unique program identifiers to enable content-based advertisement targeting.

In another aspect, a method is provided for dynamically extracting advertisement metadata from segments and manifest files being rendered in real-time, to enable targeted advertisement replacement. In one embodiment, a client proxies manifest file requests from a local media player and extracts advertisement metadata from a received manifest before forwarding it to the media player (e.g., extracting comments from an m3u8 manifest). In another embodiment, the client proxies segment requests from the media player and extracts advertisement metadata from the segment before forwarding it to the media player (e.g., extracting proprietary headers or alternate data channels from RTP or MPEG-TS streams). In another embodiment, the client monitors callbacks from the media player containing advertisement metadata (e.g., ID3 tags inserted into MPEG-TS segments).

In one embodiment, the client responds to metadata that has been inserted into a media stream to indicate upcoming advertisement boundaries. In one embodiment, advertisement decision server, program identifier, and/or advertisement spot (placement) information is included with the upcoming advertisement boundary notification metadata. The client may then attempt to prefetch an advertisement to use as a replacement for the in-stream advertisement. The client issues an advertisement placement request to an advertisement decision server providing the program identifier and/or advertisement spot information. In one embodiment, the client also provides subscriber and/or user identity, location (e.g., GPS coordinates, IP address, zip code, area code, country code, designated marketing area (DMA), etc.), and/or demographic information (e.g., gender, age, etc.) to the advertisement decision server, to aid in advertisement personalization.

In one embodiment, metadata is inserted into a media stream to indicate the exact start of the advertisement, i.e., the advertisement start boundary. In one embodiment, the advertisement start boundary exactly aligns to a segment boundary allowing for seamless advertisement replacement using segment replacement. In one embodiment, metadata is inserted into a media stream to indicate the exact end of the advertisement, i.e., the advertisement end boundary. In one embodiment, the advertisement end boundary is specified explicitly by providing the exact duration of the advertisement. In another embodiment, the end boundary of the advertisement is specified implicitly by the next subsequent program start boundary (which may be the start of a new advertisement or the restart of the main program). In one embodiment, metadata is inserted to indicate reporting requirements for advertisement playback (e.g., a URL to which beacon messages should be posted as well as authentication information and/or the format of the beacon message).

In one embodiment, the client only accepts advertisements which exactly match the specified duration of the in-stream advertisement, so that replacement of advertisements does not disrupt the timing of the live stream. In another embodiment, the client inserts any advertisement, but must monitor the live stream to determine when to resume the live stream. In one embodiment, if the replacement advertisement is shorter than the in-stream advertisement, the client may rejoin the live stream and play the remainder of the in-stream advertisement. In another embodiment, if the replacement advertisement is shorter than the in-stream advertisement, the client may display an interstitial message or image for the remainder of the duration of the in-stream advertisement and only rejoin the live stream once the in-stream advertisement has completed. In one embodiment, if the replacement advertisement is longer than the in-stream advertisement, the client may return to the live stream without playing the replacement advertisement to completion, to prevent the user from missing live stream content.

In one embodiment, the client performs advertisement replacement by proxying manifest file requests from the media player and changing the segment URL (and any associated encryption key URLs and/or encryption key metadata associated with the advertisement segments) in the manifest file that is presented to the media player. In another embodiment, the client performs advertisement replacement by transparently proxying segment requests from the media player (i.e., terminating the connection from the media player, issuing a request for an alternate segment, and returning that data to the media player). In another embodiment, the client performs advertisement replacement by proxying segment requests from the media player and redirecting the media player to an alternate segment (e.g., using an HTTP 302 redirect).

In one embodiment, when the client performs advertisement replacement, the client only selects an encoding (i.e., bitrate, frame rate, resolution, etc.) for the advertisement which matches the encoding (i.e., bitrate, frame rate, resolution, etc.) of the live stream currently being viewed. In another embodiment, if an exact match of encoding does not exist for advertisement segments, the client selects the closest matching encoding, favoring the largest encoding (i.e., bitrate, frame rate, resolution, etc.) which does not exceed the encoding (i.e., bitrate, frame rate, resolution, etc.) of the live stream currently being viewed, i.e., the encoding with the largest bitrate which does not exceed the live stream bitrate currently being used, the largest frame rate which does not exceed the live stream frame rate currently being used, and the largest resolution which does not exceed the live stream resolution currently being viewed, etc. In one embodiment, the client may choose a smaller encoding (i.e., lower bitrate, frame rate, resolution, etc.) for advertisement segments to accommodate (i.e., compensate for) higher latency in retrieving advertisement segments. In another embodiment, the client may choose a larger encoding (i.e., higher bitrate, frame rate, resolution, etc.) for advertisement segments to maximize advertisement quality and advertisement revenue generation. Techniques for dynamic selection of different encodings are described in PCT patent application PCT/US2010/060317 of Ma et al, published under PCT publication no. WO/2011/139305.

In another aspect, a method is provided for dynamically proxying advertisement segment requests, to support real-time targeted advertisement replacement. The method is suitable for use in a client-side proxy as described above, or in a network-based proxy. In one embodiment, a network proxy performs advertisement replacement by proxying manifest file requests from the media player and changing the segment URL (and any associated encryption key URLs and/or any encryption key metadata associated with the advertisement segments) in the manifest file that is presented to the media player. In another embodiment, a network proxy performs advertisement replacement by transparently proxying segment requests from the client (either from the client media player or the client-side proxy), i.e., terminating the connection from the client, issuing a request for an alternate segment, and returning that data to the client. In another embodiment, the network proxy performs advertisement replacement by proxying segment requests from the client (either from the client media player or the client-side proxy) and redirecting the client to an alternate segment (e.g., using an HTTP 302 redirect).

In one embodiment, advertisement decision server, program identifier, and/or advertisement spot (placement) information is included in the advertisement segment request. In one embodiment, the client also provides subscriber and/or user identity, location, and/or demographic information in the advertisement segment request. The network proxy issues an advertisement placement request to the advertisement decision server providing the program identifier and/or advertisement spot information. In one embodiment, the network proxy extracts subscriber and/or user identity, location, and/or demographic information from the segment requests and includes that information in the advertisement placement request, to enable more personalized advertisement selection.

In one embodiment, when a network proxy performs advertisement replacement, the network proxy only selects an encoding (i.e., bitrate, frame rate, resolution, etc.) for the advertisement which matches the encoding (i.e., bitrate, frame rate, resolution, etc.) of the live stream currently being viewed. In another embodiment, if an exact match of encoding does not exist for advertisement segments, the network proxy selects the closest matching encoding, favoring the largest encoding (i.e., bitrate, frame rate, resolution, etc.) which does not exceed the encoding (i.e., bitrate, frame rate, resolution, etc.) of the live stream currently being viewed, i.e., the encoding with the largest bitrate which does not exceed the live stream bitrate currently being used, the largest frame rate which does not exceed the live stream frame rate currently being used, and the largest resolution which does not exceed the live stream resolution currently being viewed, etc.). In one embodiment, a network proxy may choose a smaller encoding (i.e., lower bitrate, frame rate, resolution, etc.) for advertisement segments to accommodate (i.e., compensate for) higher latency in retrieving advertisement segments. In another embodiment, a network proxy may choose a larger encoding (i.e., higher bitrate, frame rate, resolution, etc.) for advertisement segments to maximize advertisement quality and advertisement revenue generation. Techniques for dynamic selection of different encodings are described in PCT patent application PCT/US2010/060317 of Ma et al, published under PCT publication no. WO/2011/139305.

In one embodiment, advertisement segments are encrypted with different encryption keys from the corresponding segments which they are replacing in the live stream and a client or network proxy must modify the manifest to reflect the encryption key URL and/or metadata associated with the advertisement segment used to replace the corresponding live stream segment. In another embodiment, advertisement segments are encrypted with the same encryption keys as the corresponding segments which they are replacing in the live stream and no manifest manipulation of the encryption key URL and/or metadata is required. In another embodiment, advertisement segments are encrypted with different encryption keys from the corresponding segments which they are replacing in the live stream and the key information is contained in the segment file header and no manifest manipulation of the encryption key URL and/or metadata is required. In another embodiment, advertisement segments are encrypted with different encryption keys from the corresponding segments which they are replacing in the live stream and a client or network proxy must decrypt the advertisement segment and re-encrypt the advertisement segment using the encryption key that corresponds to the live stream segment being replaced. In another embodiment, advertisement segments are encrypted with different encryption keys from the corresponding segments which they are replacing in the live stream but all data is presented to the media player in clear text, so a client or network proxy must decrypt the advertisement segment before presenting it to the media player. There are many ways to present the encryption key information and/or content to the media player such that the media player may understand and render the content, as should be known to those skilled in the art. In general, any method for reconciling encryption key differences may be acceptable.

A system is also disclosed for implementing a client and server infrastructure in accordance with the provisions of these methods. The system includes a live stream processor for preparing real-time content and inserting advertisement metadata, an adaptive streaming client for extracting advertisement metadata and performing targeted advertisement replacement, and an advertisement segment proxy for performing targeted advertisement replacement.

The present description focuses primarily on the replacement of advertisements in the context of live streaming, in which the input (e.g., a TV feed) already has ads in it (e.g., national ads) that are being replaced with other ads such as local ads or personalized ads. It will be appreciated that the disclosed techniques may be readily adapted for use in advertisement insertion in which advertisements are being added to an input stream, e.g., in video on demand (VOD) applications.

The above provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

FIGURES

DETAILED DESCRIPTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In the present description, the term "program boundaries" refers to both inter-program boundaries, i.e., boundaries between the end of one program and the start of another program, and intra-program boundaries which are typically advertisement boundaries (i.e., breaks in a program where advertisements are inserted). It will be appreciated that an inter-program boundary is also typically an advertisement boundary. The broader term "program boundary" is used to accommodate embodiments in which there may be boundaries that may be used for purposes other than insertion of advertisements.

Figure 1:
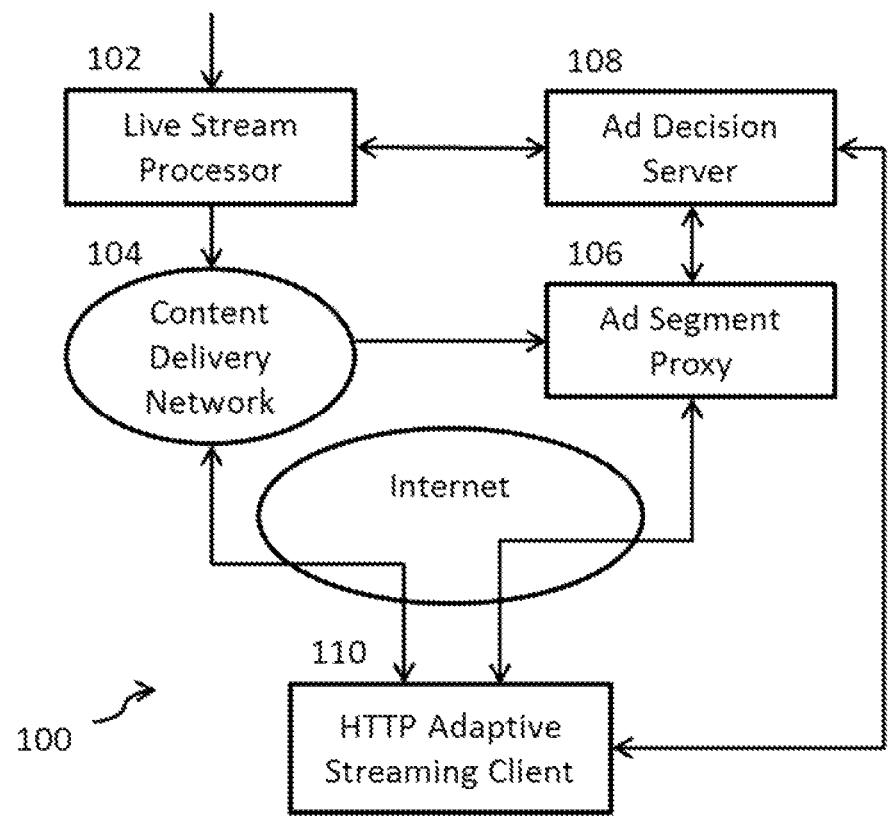
FIG. 1 is a block diagram of a system which is capable of conducting end-to-end content delivery and targeted advertisement replacement procedures, in accordance with various embodiments of the invention.

FIG. 1 is a block diagram of a system 100 for one embodiment of the present invention. The system includes a live stream processor 102, content delivery network (CDN) 104, advertisement decision server (ADS) 108, advertisement segment proxy 106 (also referred to herein as a network proxy 106), and client 110. The live stream processor 102 acquires and processes real-time audio/video content, detecting advertisement replacement/insertion opportunities and performing advertisement replacement and insertion methods. The CDN 104 distributes the processed content of the live stream processor 102. The client 110 retrieves and renders content from the CDN 104 and performs advertisement replacement and insertion methods. The network proxy 106 proxies certain content requests from the client 110 and performs advertisement replacement and insertion methods. The ADS 108 performs real-time targeted advertisement placement processing for the live stream processor 102, network proxy 106, and client 110.

The live stream processor 102, CDN 104, ADS 108, network proxy 106, and client 110 can each be realized as one or more computerized devices, each having memory storing computer program instructions, one or more processors for executing the instructions, I/O circuitry connecting the computerized device to external devices, and interconnect circuitry such as one or more high-speed buses connecting the memory, processor(s) and I/O circuitry together. Such a collection of elements may also additionally be referred to as "processing circuitry" herein. Several constituent components of the items shown in FIG. 1 are shown in additional Figures and described below, and it will be understood that the components may be realized as processing circuitry executing instructions of corresponding software elements. For example, a "parser" may be realized as computer processing circuitry executing instructions of a parser program, etc.

The live stream processor 102 is responsible for acquiring source content from a live feed and preparing the content for distribution. In one embodiment, preparation includes transcoding audio and video into a plurality of encodings using different codecs, bitrates, frame rates, sample rates, and resolutions. The transcoded content is then written into a plurality of output files. In one embodiment, a plurality of output files contain the same transcoded content encapsulated in different container formats (e.g., 3GP, MP4, MPEG-TS, WMV, MOV, etc.). In one embodiment, the prepared output files are segmented into fixed duration segment files (e.g., MPEG-TS segments, fragmented MP4 segments, 3GP DASH segments, etc.). In one embodiment, the output files, both segmented and un-segmented, are encrypted using standard encryption protocols (e.g., AES-128, HC-128, RC4, etc.). In one embodiment, the live stream processor 102 generates manifest files indicating segment retrieval locations for each encoding (e.g., HLS m3u8, DASH MPD, etc.).

In one embodiment, the live stream processor 102 detects advertisement breaks in the live feed. In one embodiment, the live feed is a linear television feed. In one embodiment, the live feed contains SCTE-35 cue tones which indicate upcoming advertisement pods (breaks), the start of each advertising pod, and the end of each advertisement pod. In one embodiment, the SCTE-35 program descriptors describe the structure (i.e., the number of advertisement and duration of each advertisement) of the advertisement pods. In another embodiment, the live stream processor 102 issues SCTE-130 requests to an ADS 108 to determine the structure (i.e., the number of advertisement and duration of each advertisement) of the advertisement pods.

In one embodiment, the live stream processor 102 creates segments from the live stream input using fixed duration segments. In one embodiment, the live stream processor 102 uses advertising pod structure information to dynamically create segment boundaries on the advertisement boundaries. As an example, given an advertisement pod with two advertisements, the first with a 15 second duration and the second with a 25 second duration, where the advertisement pod would start 7 seconds into a given segment N, fixed duration segments would have advertisement 1 starting 7 seconds into segment N, advertisement 2 starting 3 seconds into segment N+2, and the main program resuming 7 seconds into segment N+3:

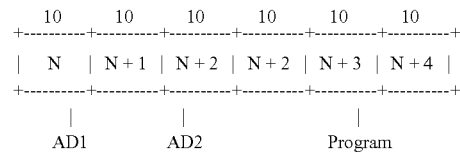

With dynamic segment boundaries, the same scenario of an advertisement pod with two advertisements, the first with a 15 second duration and the second with a 25 second duration, where the advertisement pod would start 7 seconds into a given segment N, fixed duration segments would have segment N truncated to 7 seconds, advertisement 1 starting on a new segment boundary (i.e., start of segment N+1), segment N+2 truncated to 5 seconds, advertisement 2 starting on a new segment boundary (i.e., start of segment N+3), segment N+5 truncated to 5 seconds, and the main program resuming on a new segment boundary (i.e., start of segment N+6):

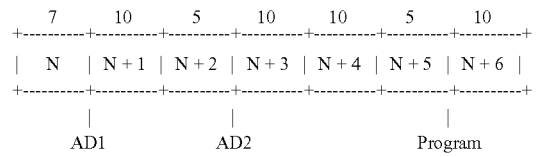

In one embodiment, the live stream processor 102 issues advertisement placement requests to the ADS 108 for one or more of the advertisement insertion opportunities specified in the advertisement pod. In one embodiment, the ADS 108 is the same SCTE-130 server used to determine the advertisement pod structure. In one embodiment, the live stream processor 102 replaces the segments within the advertisement program boundaries generated from the live feed with segments specified in the advertisement placement response. In one embodiment, the live stream processor 102 downloads the replacement advertisement segments to replace the actual segments. In another embodiment, the live stream processor 102 replaces the segment URLs associated with advertisements (i.e., segments within advertisement boundaries) in the manifest file with URLs pointing to the segments specified in the advertisement placement response. In one embodiment, the live stream processor 102 caches the advertisement placement response for use in future advertisement replacement opportunities. In one embodiment, the live stream processor 102 also processes the advertisement source content to ensure that the available encodings for the advertisement match the encodings being used for the processing of the live stream.

In one embodiment, the live stream processor 102 inserts metadata into the segments to indicate to the client 110 upcoming advertisement boundaries, as well as the actual start and end of each advertisement. In one embodiment, the metadata is inserted using the de facto standard ID3 version 2 metadata container format (referred to herein as ID3 tags) in MPEG-TS segments. In another embodiment, the metadata is inserted in proprietary data channels in RTP segments. In another embodiment, the metadata is inserted in proprietary DASH headers. There a many segment formats and many ways to insert custom metadata into a given segment format as should be known to those skilled in the art. Any method for inserting metadata into a segment would be suitable for advertisement boundary metadata.

In one embodiment, the live stream processor 102 inserts metadata into the manifest files to indicate to the client 110 upcoming advertisement boundaries as well as the actual start and end of each advertisement. In one embodiment, the live stream processor 102 inserts advertisement pod structure metadata into the manifest files to indicate to the client 110 the ad within the pod to which each segment belongs. In one embodiment, the live stream processor 102 inserts advertisement segment offset metadata into the manifest files to indicate to the client 110 the sequence numbers of the segments within each advertisement and within the advertisement pod. In one embodiment, the metadata is inserted as comments in an m3u8 manifest file. In another embodiment, the metadata is inserted as custom tags in a DASH MPD manifest file. There a many manifest file formats and many ways to insert custom metadata into a given manifest file format as should be known to those skilled in the art. Any method for inserting metadata into a manifest file would be suitable for advertisement boundary metadata.

In one embodiment, the segment URLs inserted into the manifest file point to an advertisement segment proxy 106, rather than to the actual segments in the CDN 104. In one embodiment, the advertisement metadata includes the duration of each advertisement. In one embodiment, the advertisement metadata includes the duration of the advertisement pod. In one embodiment, the advertisement metadata includes network address information for the ADS 108. In one embodiment the advertisement metadata includes spot (placement) information for each advertisement. In one embodiment, the advertisement metadata includes program identifiers, original program broadcast time, advertising restrictions, and program demographic information to be used in targeted advertisement decision making. In one embodiment, metadata for the end of the final advertisement in the advertisement pod is included as metadata indicating the restart of the main program.

In one embodiment, the live stream processor 102 uploads the segment files and manifest files to a CDN 104 from which they are retrieved by the client 110. In one embodiment, the client 110 retrieves segment and manifest files directly from the live stream processor 102. In another embodiment, the client 110 retrieves manifest files from the live stream processor 102 and segment files from the CDN 104. In one embodiment, the client 110 detects the advertisement metadata and performs targeted advertisement replacement. In one embodiment, the client 110 detects advertisement metadata by proxying manifest file requests from its media player (see more detailed description below) and parsing the manifest file (e.g., detecting custom comments in an HLS m3u8, or custom tags in a DASH MPD). In another embodiment, the client 110 detects advertisement metadata by proxying segment requests from the media player and parsing the segment data (e.g., detecting custom metadata RTP channels). In another embodiment, the client 110 detects advertisement metadata by monitoring callbacks from the media player (e.g., receiving ID3 callbacks).

In one embodiment, the URLs for advertisement segments point to a network proxy 106, as specified by the live stream processor 102. In one embodiment, the client 110 augments the segment requests with subscriber and/or user identity, location, and/or demographic information. The network proxy 106 receives the segment request, extracts the advertisement placement information, and any program information provided by the live stream processor 102, as well as any subscriber and/or user identity, location, and/or demographic information provided by the client 110, and issues an advertisement placement request to the ADS 108 with that information. The ADS 108 selects a targeted replacement advertisement and notifies the network proxy 106. In one embodiment, the network proxy transparently proxies the advertisement segment from the CDN 104 to the client 110. In another embodiment, the network proxy redirects the client 110 to the advertisement segment in the CDN 104 (e.g., using an HTTP 302 redirect). In one embodiment, the network proxy 106 caches the advertisement placement response for use in future advertisement replacement opportunities.

In another embodiment, the client 110 performs targeted advertisement replacement by contacting the ADS 108 directly. The client 110 extracts the advertisement placement information, and any program information provided by the live stream processor 102, and issues an advertisement placement request to the ADS 108 with that information. In one embodiment, the client 110 augments the advertisement placement requests with subscriber and/or user identity, location, and/or demographic information. In one embodiment, the client 110 performs advertisement replacement by proxying manifest file requests from the media player and changing the segment URL in the manifest file that is presented to the media player. In another embodiment, the client 110 performs advertisement replacement by proxying segment requests from the media player and transparently proxying the segment request (i.e., terminating the connection from the media player, issuing a request for an alternate segment, and returning that data to the media player). In another embodiment, the client 110 performs advertisement replacement by proxying segment requests from the media player and redirecting the media player to an alternate segment (e.g., using an HTTP 302 redirect). In one embodiment, the client 110 caches the advertisement placement response for use in future advertisement replacement opportunities.

Figure 2:
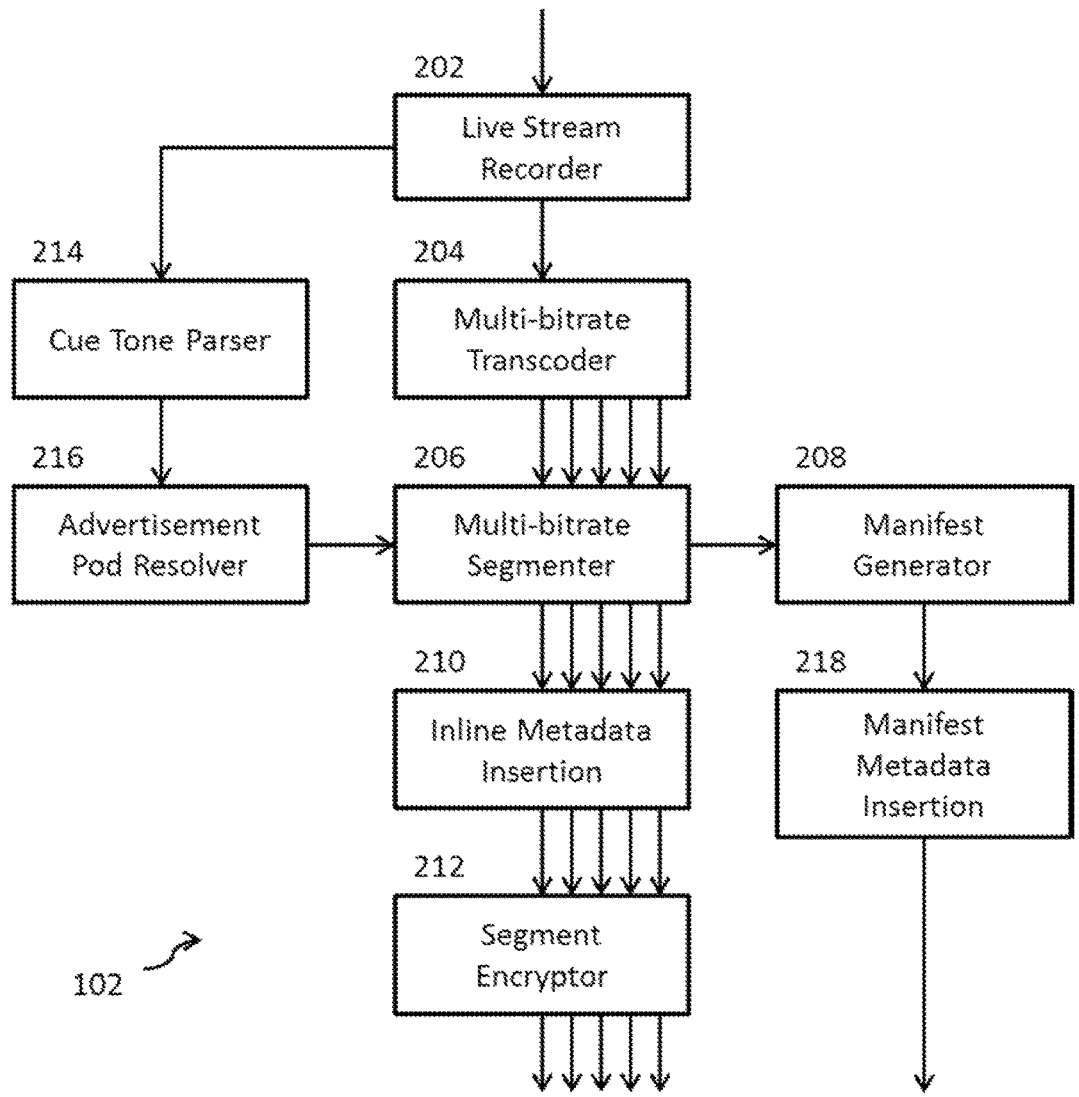
FIG. 2 is a block diagram of a system which is capable of conducting advertisement metadata insertion procedures, in accordance with various embodiments of the invention.

FIG. 2 is a block diagram of a live stream processor 102 for one embodiment of the present invention for implementing a live stream processor 102. The live stream processor 102 includes multiple components, including a live stream recorder 202 which records source audio/video content, a multi-bitrate transcoder 204 which transcodes source content into different bitrate encodings, a multi-bitrate segmenter 206 which creates segment files from transcoded content, an inline metadata insertion module 210 which inserts metadata into segment files, a segment encryptor 212 which encrypts segments prior to uploading them to a CDN 104, a manifest generator 208 which creates manifest files to describe segmented content, and a manifest metadata insertion module 218 which inserts metadata into manifest files prior to uploading them to a CDN 104. The live stream processor 102 also contains a cue tone parser 214 which monitors source content and detects advertisement and program boundaries, as well as an advertisement pod resolver which determines the structure of advertisement pods (breaks).

The live stream recorder 202 is responsible for attaching to the live feed using various protocols (e.g., unicast MPEG-TS, multi-cast MPEG-TS, unicast RTP, multi-cast RTP, HLS, DASH, RTMP, etc.). The live stream recorder 202 passes the stream data to the multi-bitrate transcoder 204 which transforms the content into a plurality of encodings using different codecs, bitrates, frame rates, sample rates, and resolutions. The live stream recorder 202 also passes SCTE-35 cue tones, as well as current wall clock and program timestamp information, to the cue tone parser 214 which extracts upcoming advertisement pod information, including advertisement pod start, and advertisement pod end information. The cue tone parser 214 then passes the advertisement pod information to the advertisement pod resolver 216.

The advertisement pod resolver 216 determines advertisement pod structure (i.e., number of advertisements and duration of each advertisement). In one embodiment, the advertisement pod resolver 216 uses the SCTE-35 cue tone information to determine the advertisement pod structure. In another embodiment, the advertisement pod resolver 216 issues SCTE-130 requests to the ADS 108 to determine the advertisement pod structure. In one embodiment, the SCTE-130 request includes the program identifier and correlated program wall clock time (i.e., the wall clock time recorded by the live stream recorder 202 corresponding to the program timestamp referenced in the cue tone, calculated as a relative offset from the start of the program). There are many advertisement cue and pod structure notification protocols besides SCTE-35 and SCTE-130 (e.g., the IAB Video Multiple Ad Playlist (VMAP) or other proprietary XML-based protocols), both in band and out-of-band, as should be known to those skilled in the art. It should be understood that the cue tone parser 214 and advertisement pod resolver 216 are flexible enough to support any valid advertisement cue and/or pod structure notification protocols.

In one embodiment, the advertisement pod resolver 216 issues advertisement placement requests to the ADS 108 for one or more of the advertisement insertion opportunities specified in the advertisement pod. In one embodiment, the ADS 108 is the same SCTE-130 server used to determine the advertisement pod structure. In one embodiment, the advertisement pod resolver 216 caches advertisement placement responses for use in future advertisement replacement opportunities.

The multi-bitrate transcoder 204 forwards the various encodings to the multi-bitrate segmenter 206. The advertisement pod resolver 216 forwards upcoming advertisement pod notifications and advertisement pod structure information to the multi-bitrate segmenter 206. The multi-bitrate segmenter 206 is responsible for generating dynamic segment boundaries based on the advertisement pod structure, such that each advertisement starts on a new segment boundary and resumption of the main program also starts on a new segment boundary. In one embodiment, the multi-bitrate segmenter 206 downloads the replacement advertisement segments specified in the advertisement placement response, replacing the generated segments with the downloaded segments.

The multi-bitrate segmenter 206 forwards segment boundary information to the manifest generator 208. The manifest generator 208 creates updated real-time manifest files, with metadata indicating upcoming advertisement breaks as well as the actual start and end of each advertisement. The manifest generator 208 then forwards the manifest to the manifest metadata insertion module 218. The manifest metadata insertion module 218 is responsible for inserting additional metadata into the manifest (e.g., ADS 108 location information, program identifiers, original program broadcast time, program advertisement restrictions, program demographic information, etc.). The manifest metadata insertion module 218 is also responsible for performing segment URL rewrite. In one embodiment, the advertisement segment URLs are rewritten to point to the replacement advertisement segments specified in the advertisement placement response. In another embodiment, the advertisement segment URLs are rewritten to point to the ADS 108. There are multiple manifest formats (e.g., HLS m3u8, DASH MPD, etc.) as should be known to those skilled in the art. It should be understood that the manifest generator 208 and manifest metadata insertion module 218 are flexible enough to support generating and modifying any valid manifest file format, respectively. The manifest metadata insertion module uploads the final manifest to the CDN 104.

The multi-bitrate segmenter 206 forwards segments to the inline metadata insertion module 210. The inline metadata insertion module 210 is responsible for inserting upcoming advertisement break notifications and exact advertisement start and end notification into the segments. In one embodiment, the metadata insertion module 210 also inserts network address information for the ADS 108, as well as program identifier, original program broadcast time, program advertisement restrictions, and program demographic information. There are multiple segment file formats (e.g., MPEG-TS, DASH, RTP, etc.), as well as multiple metadata insertion methods for each format (e.g., ID3 tags, custom metadata headers, alternate data channels, etc.), as should be known to those skilled in the art. It should be understood that the inline metadata insertion module 210 is flexible enough to support modifying any valid segment file format using any valid metadata insertion method. The inline metadata insertion module 210 then forwards the segments to the segment encryptor 212 which encrypts the segments using standard encryption protocols (e.g., AES-128, HC-128, RC4, etc.). The segment encryptor 212 uploads the final segments to the CDN 104.

Figure 3:
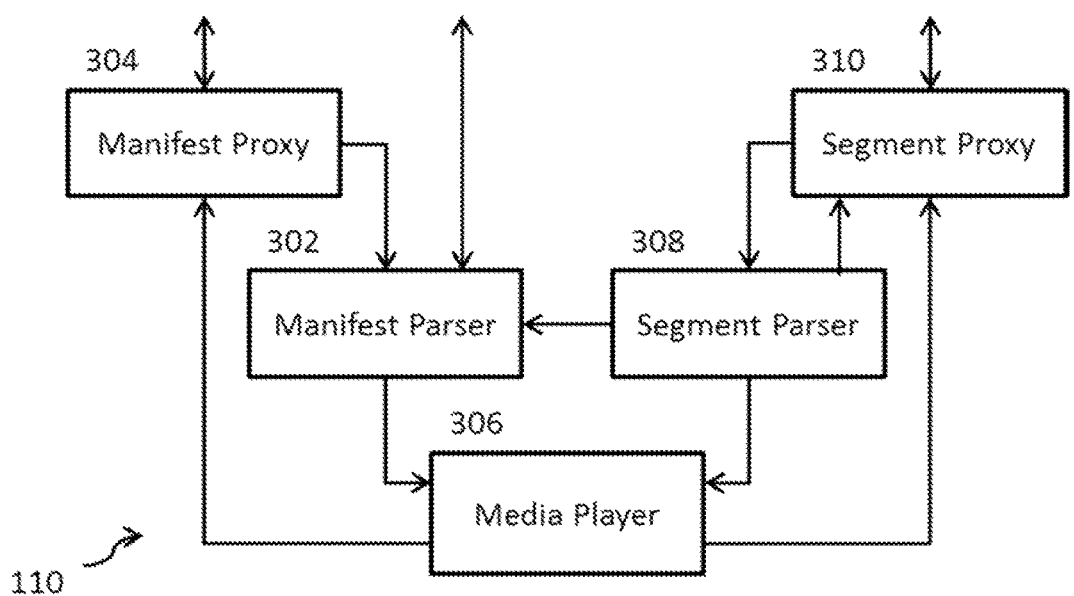
FIG. 3 is a block diagram of a client which is capable of conducting targeted advertisement replacement procedures, in accordance with various embodiments of the invention.

FIG. 3 is a block diagram for one embodiment of the present invention for implementing an HTTP adaptive streaming client 110. The client 110 includes a media player 306 which renders content, a manifest proxy 304 which transparently proxies manifest requests from the media player 306, and a segment proxy 310 which transparently proxies segment requests from the media player 306 and redirects segment requests to replace advertisements. The client 110 also contains a segment parser 308 which extracts metadata from segment files, as well as a manifest parser 302 which extracts metadata from manifest files and rewrites manifest files to replace advertisements.

In one embodiment, the media player 306 initiates playback by requesting a manifest file from the manifest proxy 304. In one embodiment, the manifest proxy 304 retrieves the manifest from the CDN 104. In another embodiment, the manifest proxy 304 retrieves the manifest directly from the live stream processor 102. The manifest proxy 304 provides the manifest to the manifest parser 302 which detects upcoming advertisement breaks, detects the start and end of advertisements, and extracts advertisement metadata from the manifest file. There are multiple manifest formats (e.g., HLS m3u8, DASH MPD, etc.) as should be known to those skilled in the art. It should be understood that the manifest proxy 304 and manifest parser 302 are flexible enough to support generating and modifying any valid manifest file format.

In one embodiment, the manifest parser 302, upon detection of an upcoming advertisement break, extracts network address information for the ADS 108 as well as any program identification, original program broadcast time, advertisement restriction, and or program demographic information and issues a placement request to the ADS 108. In one embodiment, the manifest parser 302 includes subscriber and/or user identity, location, and/or demographic information in the advertisement placement request. In one embodiment, the ADS 108 responds with a manifest file or a URL pointing to a manifest file specifying the segments for the replacement advertisement. In another embodiment, the ADS 108 responds with an advertisement media identifier to be used to look up advertisement segment information. In another embodiment, the ADS 108 responds with a URL pointing to a standalone file, not suitable for insertion into an HTTP adaptive streaming manifest.

In one embodiment, if the ADS 108 returns a URL pointing to a standalone file, not suitable for insertion into an HTTP adaptive streaming manifest, the client 110 will use a two player approach wherein one media player 306 is stopped or paused and a second media player (not shown) is created to play the advertisement, before resuming playback on the first media player 306. In another embodiment, where the ADS 108 returns a manifest file or a URL pointing to a manifest file specifying the segments for the replacement advertisement, the manifest parser 302 will modify the manifest presented to the media player 306, replacing the in-stream advertisement segment URLs (and any associated encryption key URLs and/or encryption key metadata) with the replacement advertisement segment URLs (and any associated encryption key URLs and/or encryption key metadata) provided by the ADS 108. The manifest parser 302 prefetches the replacement advertisement information upon detection of an upcoming advertisement break and waits for the actual start of the advertisement break to replace the advertisement segment URLs. In another embodiment, where the ADS 108 returns an advertisement media identifier, the manifest parser 302 first looks up the segment location information for the given advertisement media identifier, before modifying the manifest presented to the media player 306, replacing the in-stream advertisement segment URLs with the replacement advertisement segment URLs (and any associated encryption key URLs and/or encryption key metadata) found in the look up.

In one embodiment, if the replacement advertisement is shorter than the in-stream advertisement, the manifest parser 302 may choose to only replace a subset of the in-stream advertisement segment URLs, allowing the media player 306 to play the remainder of the in-stream advertisement. In another embodiment, if the replacement advertisement is shorter than the in-stream advertisement, the manifest parser 302 may choose to display an interstitial message or image for the remainder of the duration of the in-stream advertisement and only allow the media player 306 to rejoin the live stream once the in-stream advertisement has completed. In one embodiment, if the replacement advertisement is longer than the in-stream advertisement, the manifest parser 302 may use only a subset of the replacement advertisement segments allowing the media player 306 to return to the live stream without playing the entire replacement advertisement to completion, to prevent the user from missing live stream content. In one embodiment, the manifest parser 302 detects the completion of advertisement playback based on the consistent request for manifest files including all of the segments for a given advertisement as well as a request for a manifest containing subsequent non-advertisement segments. In one embodiment, the manifest parser 302 issues a beacon message to the ADS 108 to inform it of the completed advertisement playback and record the advertisement impression. In one embodiment, the manifest parser 302 issues beacons for each manifest request corresponding to a subsequent advertisement segment to provide progressive advertisement impression information to the ADS 108.

In one embodiment, if the replacement advertisement does not support an identical encoding to that of the live stream segment being replaced, the manifest parser 302 may choose from any of the available encodings. In one embodiment, the manifest parser 302 may favor a smaller encoding (i.e., lower bitrate, frame rate, resolution, etc.) to accommodate (i.e., compensate for) higher latency in retrieving advertisement segments. In another embodiment, the manifest parser 302 may favor a larger encoding (i.e., higher bitrate, frame rate, resolution, etc.) to maximize advertisement quality and advertisement revenue generation. In another embodiment, the manifest parser 302 may choose to display an interstitial message or image for the duration of the in-stream advertisement rather than select an encoding that does not match exactly.

In one embodiment, the media player 306, upon receiving a manifest file, issues requests for segment files to the segment proxy 310. In one embodiment, the segment proxy 310 detects the requests for advertisement segments based on the URL structure of the segment. There are multiple ways to encode metadata into a URL (e.g., URI structure, query string arguments, etc.), as should be known to those skilled in the art. It should be understood that the segment proxy 310 is flexible enough to support detecting advertisement segment requests using any valid URL-based metadata encoding method. In one embodiment, non-advertisement segments are retrieved from the CDN 104. In another embodiment, non-advertisement segments are retrieved directly from the live stream processor 102.

The segment proxy 310 forwards non-advertisement segments to the segment parser 308. In one embodiment, the segment parser 308 detects upcoming advertisement break notifications embedded in the segments and extracts network address information for the ADS 108, as well as any program identification, original program broadcast time, advertisement restriction, and/or program demographic information. There are multiple segment file formats (e.g., MPEG-TS, DASH, RTP, etc.), as well as multiple metadata insertion methods for each format (e.g., ID3 tags, custom metadata headers, alternate data channels, etc.), as should be known to those skilled in the art. It should be understood that the segment parser 308 is flexible enough to support parsing and detecting metadata in any valid segment file format using any valid metadata insertion method. In one embodiment, the segment parser 308 provides upcoming advertisement break notifications to the manifest parser 302. In one embodiment, the segment parser 308 also provides upcoming advertisement break notifications to the segment proxy 310. The segment parser 308 responds to the media player 306 with the segment.

In one embodiment, the segment proxy 310, upon receiving notification of an upcoming advertisement break, issues an advertisement placement request to the ADS 108 including any program identification, original program broadcast time, advertisement restriction, and or program demographic information. In one embodiment, the segment proxy 310 includes subscriber and/or user identity, location, and/or demographic information in the advertisement placement request. In one embodiment, the ADS 108 responds with a manifest file or a URL pointing to a manifest file specifying the segments for the replacement advertisement. In one embodiment, when the segment proxy 310 detects a request for the first advertisement segment, it replaces the advertisement with the one provided by the ADS 108. In one embodiment, the advertisement placement response and manifest file are cached for use in future advertisement replacement opportunities. In one embodiment, the segment proxy 310 downloads the alternate advertisement segments and provides them to the segment parser 308. The segment parser 308 responds to the media player 306 with the alternate segment. In one embodiment, the segment parser 308 decrypts the advertisement segment and re-encryptions the advertisement segment using the same encryption key as the live stream segment being replaced before sending it to the media player 306.

In one embodiment, if the replacement advertisement is shorter than the in-stream advertisement, the segment proxy 310 may choose to only replace a subset of the in-stream advertisement segment URLs, allowing the media player 306 to play the remainder of the in-stream advertisement. In another embodiment, if the replacement advertisement is shorter than the in-stream advertisement, the segment proxy 310 may choose to display an interstitial advertisement for the remainder of the duration of the in-stream advertisement and only allow the media player 306 to rejoin the live stream once the in-stream advertisement has completed. In one embodiment, if the replacement advertisement is longer than the in-stream advertisement, the segment proxy 310 may use only a subset of the replacement advertisement segments allowing the media player 306 to return to the live stream without playing the entire replacement advertisement to completion, to prevent the user from missing live stream content.

In one embodiment, if the replacement advertisement does not support an identical encoding to that of the live stream segment being replaced, the segment proxy 310 may choose from any of the available encodings. In one embodiment, the segment proxy 310 may favor a smaller encoding (i.e., lower bitrate, frame rate, resolution, etc.) to accommodate (i.e., compensate for) higher latency in retrieving advertisement segments. In another embodiment, the segment proxy 310 may favor a larger encoding (i.e., higher bitrate, frame rate, resolution, etc.) to maximize advertisement quality and advertisement revenue generation. In another embodiment, the segment proxy 310 may choose to display an interstitial message or image for the duration of the in-stream advertisement rather than select an encoding that does not match exactly.

In one embodiment, the segment proxy 310 detects the last segment for an advertisement and notifies the segment parser 308 that the retrieved segment is the last for the current advertisement. The segment parser 308 extracts advertisement beacon message metadata (e.g., a URL to which beacon messages should be posted, authentication information, and/or the format of the beacon message) from the segment. In one embodiment, the segment parser 308 notifies the manifest parser 302 when the media player 306 completes retrieval of the last segment for the advertisement. In another embodiment, the segment parser issues a beacon message to the ADS 108 to notify the ADS 108 that the media player 306 has completed retrieval of the last segment for the given advertisement and record the advertisement impression. In one embodiment, the segment parser 308 issues beacons for each advertisement segment delivered to the media player 306 to provide progressive advertisement impression information to the ADS 108.

Figure 4:
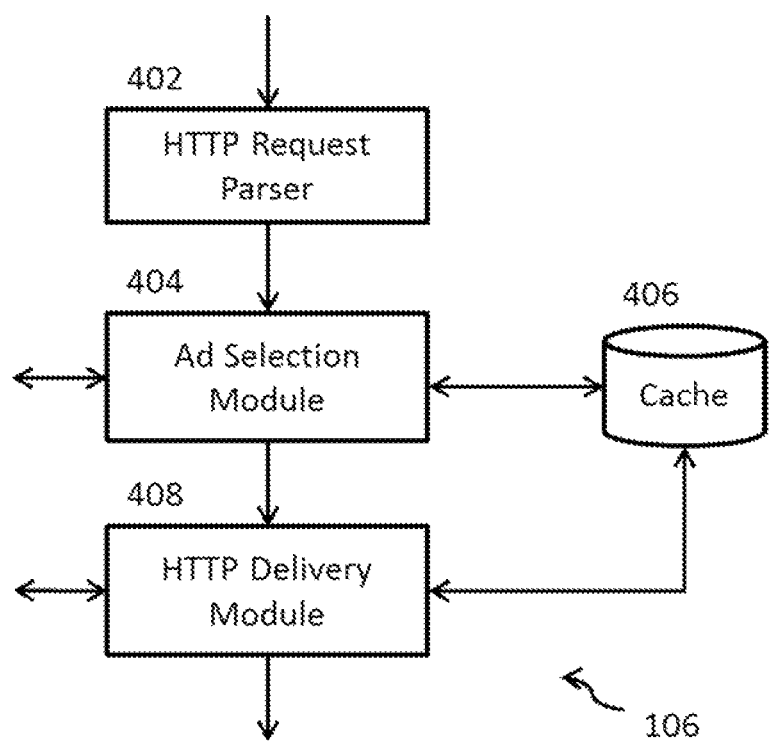
FIG. 4 is a block diagram of a network proxy which is capable of conducting targeted ad replacement procedures, in accordance with various embodiments of the invention.

FIG. 4 is a block diagram for one embodiment of the present invention for implementing an advertisement segment proxy (network proxy) 106. The network proxy 106 includes an HTTP request parser 402 which handles and extracts metadata from HTTP-based segment and/or manifest retrieval requests from clients 110, an advertisement selection module 404 which selects replacement advertisements and maps individual requests to specific segments, a segment delivery module 408 which responds to clients 110 with cached segment data or segment location redirects, and a cache 406 for storing advertisement placement information as well as advertisement segments.

In one embodiment, the HTTP request parser 402 receives a manifest request from the client 110. The HTTP request parser 402 retrieves the current manifest from the CDN 104 and parses out advertisement segment sequence numbers, spot identifiers, program identifiers, original program broadcast time, advertisement restrictions, program demographic information, subscriber information, and/or user identity, location, and/or demographic information and forwards it to the advertisement selection module 404. If the newest (most recently generated) segment listed in the manifest is the first segment of an advertisement, the advertisement selection module 404 issues an advertisement placement request to the ADS 108 including the extracted information. In one embodiment, the advertisement selection module 404 may use cached advertisement placement responses for demographically similar client 110 requests. In one embodiment, the ADS 108 responds with a manifest file or a URL pointing to a manifest file specifying the segments for the replacement advertisement. In another embodiment, the ADS 108 responds with an advertisement media identifier used to look up manifest and/or segment information for the selected advertisement. In one embodiment, the advertisement selection module 404 stores the advertisement placement response in the cache 406. If the manifest contains multiple segments for the advertisement, the advertisement selection module 404 retrieves the segment information for each of the advertisement segments listed in the manifest, based on the advertisement segment sequence number from the cache 406. The advertisement selection module 404 then forwards the updated manifest to the HTTP delivery module 408 which forwards the modified manifest to the client 110.

In one embodiment, the HTTP request parser 402 receives an advertisement segment request from the client 110. The HTTP request parser 402 parses out advertisement segment sequence numbers, spot identifiers, program identifiers, original program broadcast time, advertisement restrictions, program demographic information, subscriber information, and/or user identity, location, and/or demographic information and forwards it to the advertisement selection module 404. If the request is for the first segment in the advertisement, the advertisement selection module 404 issues an advertisement placement request to the ADS 108 including the extracted information. In one embodiment, the advertisement selection module 404 may use cached advertisement placement responses for demographically similar client 110 requests. In one embodiment, the ADS 108 responds with a manifest file or a URL pointing to a manifest file specifying the segments for the replacement advertisement. In another embodiment, the ADS 108 responds with an advertisement media identifier used to look up manifest and/or segment information for the selected advertisement. In one embodiment, the advertisement selection module 404 stores the advertisement placement response in the cache 406. If the request is for a segment other than the first segment in the advertisement, the advertisement selection module 404 retrieves the segment information for the current segment, based on the advertisement segment sequence number from the cache 406. The advertisement selection module 404 then forwards the segment information to the HTTP delivery module 408. In one embodiment, the HTTP delivery module 408 transparently proxies the segment request by retrieving the actual segment from the CDN 104 and forwarding the data to the client 110. In one embodiment, the segment delivery module 408 stores the retrieved segment in the cache 406. In one embodiment, the segment delivery module 408 uses cached segments from the cache 406 to respond to clients 110 directly. In another embodiment, the segment delivery module 408 redirects the client 110 to the location of the segment in the CDN 104 (e.g., using HTTP 302 redirects). In one embodiment, the HTTP delivery module 408 decrypts the advertisement segment and re-encryptions the advertisement segment using the same encryption key as the live stream segment being replaced before sending it to the client 110.

In one embodiment, if the replacement advertisement does not support an identical encoding to that of the live stream segment being replaced, the advertisement selection module 404 may choose from any of the available encodings. In one embodiment, the advertisement selection module 404 may favor a smaller encoding (i.e., lower bitrate, frame rate, resolution, etc.) to accommodate (i.e., compensate for) higher latency in retrieving advertisement segments. In another embodiment, the advertisement selection module 404 may favor a larger encoding (i.e., higher bitrate, frame rate, resolution, etc.) to maximize advertisement quality and advertisement revenue generation. In another embodiment, the advertisement selection module 404 may choose not to replace the advertisement in the live stream if it is unable to select an encoding that matches exactly.

Figure 5:
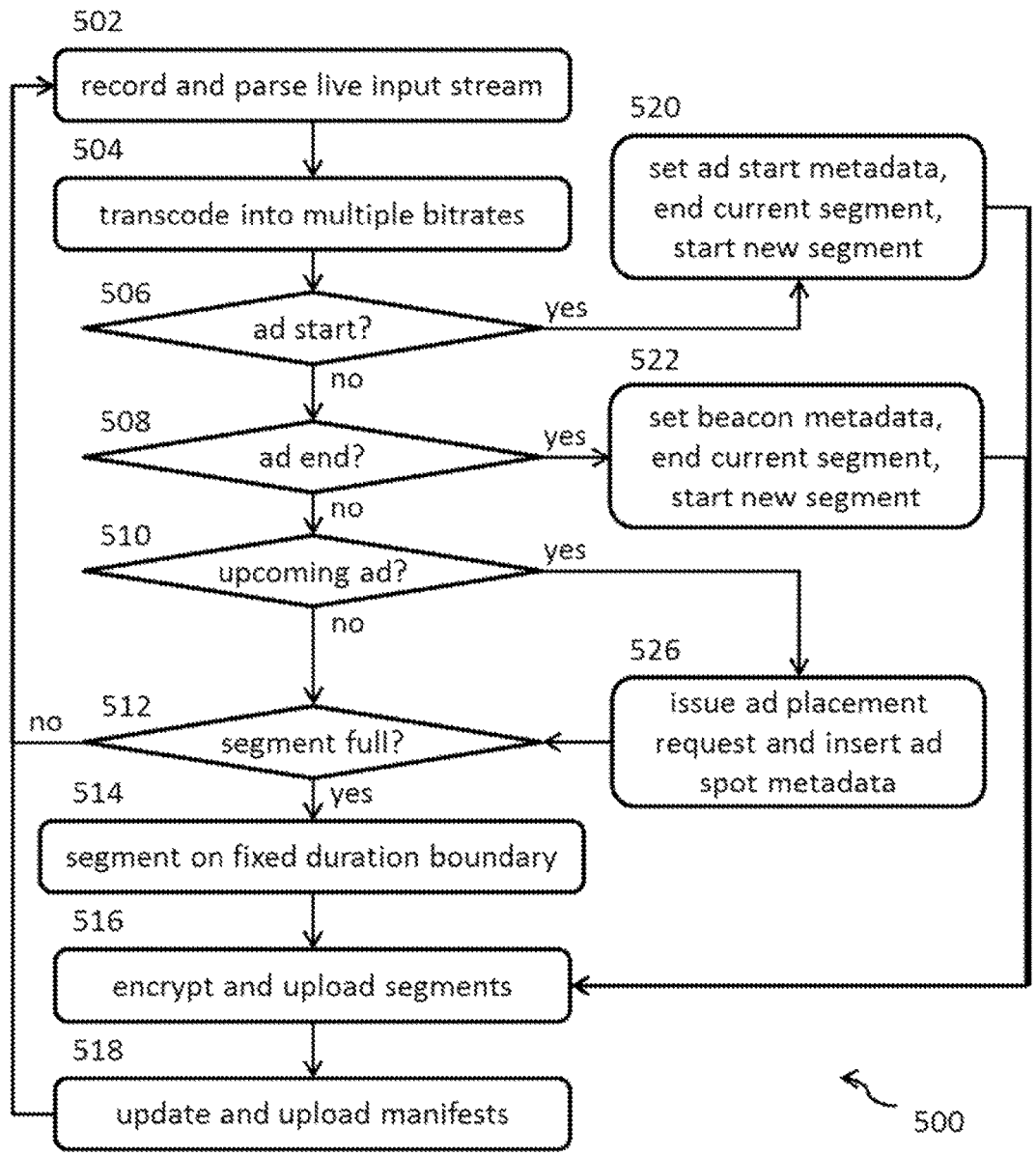
FIG. 5 is a flow chart showing a method for performing advertisement metadata insertion, in accordance with an embodiment of the present invention.

FIG. 5 is a flow chart describing a process 500 of the live stream processor 102 for performing advertisement boundary-based segmentation and advertisement metadata insertion. In step 502, the live stream processor 102 begins recording live feed data and parsing out cue tone data (e.g., program identifiers, current program and wall clock timestamp information, etc.). The current wall clock time is correlated to the program timestamp and stored as the original broadcast time. In one embodiment, the current wall clock time and program timestamp are recorded at the beginning of live stream processing, and all future wall clock times are calculated as an offset from the beginning of live stream processing, i.e., given an initial wall clock time W and an initial program timestamp P, and a program timestamp to wall clock time conversion ratio R, the current wall clock time C may be calculated from the current program timestamp T as $C=W+(T-P)*R$. The live feed data is fed into the transcoder in step 504, where the input stream is transcoded into a plurality of encodings using different codecs, bitrates, frame rates, sample rates, and resolutions.

In steps 506-510, the live stream processor 102 checks and responds to cue data in the live feed. In one embodiment, the live feed contains SCTE-35 cue tones which indicate upcoming advertisement pods (breaks), the start of each advertising pod, and the end of each advertisement pod. These cue tones are used for selective processing as now described in detail. In another embodiment, the advertisement pods (breaks) are defined a priori and provided out-of-band.

In step 506, if the cues indicate the start of a new advertisement, processing proceeds to step 520 where the current segment is truncated and a new segment is started so that the start of the advertisement will align with a segment boundary. Advertisement start metadata is inserted into the new segment. Processing then proceeds to step 516 where the truncated segment is encrypted and uploaded to the CDN 104. Processing then proceeds to step 518 where the manifest file is updated with the truncated segment information and the advertisement start metadata for the subsequent segment and uploaded to the CDN 104. Processing then proceeds back to step 502 where processing of the live feed continues.

In step 506, if the cues did not indicate the start of an advertisement, processing continues to step 508. In step 508, if the cues indicate the end of an advertisement, processing proceeds to step 522 where the current segment is truncated and a new segment is started so that the start of the next program (be it an advertisement or the main program) will align with a segment boundary. Advertisement beacon message metadata is inserted into the truncated segment. Processing then proceeds to step 516 where the truncated segment is encrypted and uploaded to the CDN 104. Processing then proceeds to step 518 where the manifest file is updated with the truncated segment information and both advertisement end metadata and advertisement beacon message metadata and uploaded to the CDN 104. Processing then proceeds back to step 502 where processing of the live feed continues.

In step 508, if the cues did not indicate the end of an advertisement, processing continues to step 510. In step 510, if the cues do not indicate an upcoming advertisement break, processing proceeds directly to step 512. In step 510, if the cues indicate an upcoming advertisement break, processing proceeds to step 526 in which metadata is inserted into the current segment specifying the upcoming advertisement break, as well as program identifier, original program broadcast time, program advertisement restrictions, and program demographic information metadata. Advertisement break metadata, as well as program identifier, original program broadcast time, program advertisement restrictions, and program demographic information metadata are also inserted into the manifest file. In one embodiment, the SCTE-35 program descriptors describe the structure (i.e., the number of advertisement and duration of each advertisement) of the advertisement pod. In another embodiment, in step 526, the live stream processor 102 issues an SCTE-130 request to the ADS 108 to determine the structure (i.e., the number of advertisement and duration of each advertisement) of the advertisement pod. In one embodiment, the SCTE-130 request includes the program identifier and correlated program wall clock time C for the cue point. The cue data for the current advertisement pod is updated with the advertising pod structure information returned by the ADS 108. Processing then proceeds to step 512.

In step 512, a check is performed to see if the segment is complete (in terms of segment duration). Under normal circumstances, segments are considered complete when their duration is greater than or equal to the fixed target segment duration. In one embodiment, segment durations are a fixed multiple of the GOP (group-of-pictures) duration. Shorter segments may be created in steps 520 and 522 if truncation is required to properly align segment starts to program boundaries. Otherwise, segments are created on duration boundaries in step 512. If the segment is not yet complete, processing proceeds back to step 502 where live stream processing continues. If the segment is complete, processing proceeds to step 514 where the current segment is closed and a new segment is started. Processing then proceeds to step 516 where the completed segment is encrypted and uploaded to the CDN 104. Processing then proceeds to step 518 where the manifest is updated with the completed segment information and uploaded to the CDN 104. In one embodiment, the process maintains state relating to whether or not the current segment being processed is part of an advertisement (i.e., by keeping track of the start and end cue tones) and additional metadata is added to the manifest, including advertisement segment sequence numbers. Processing then proceeds back to step 502 where processing of the live feed continues.

Figure 6:
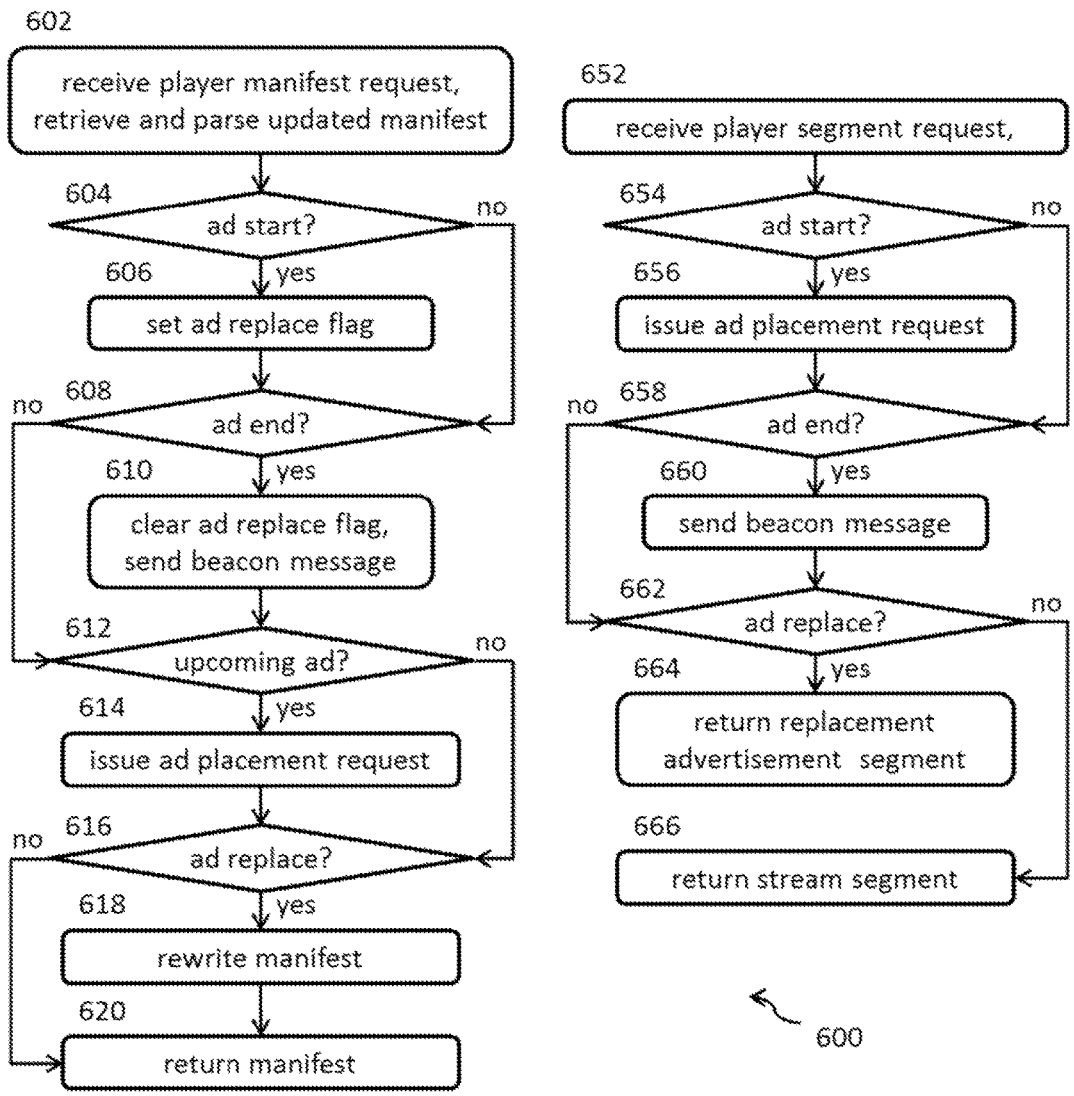
FIG. 6 is a flow chart showing a method for performing client-side targeted advertisement replacement, in accordance with an embodiment of the present invention.

FIG. 6 is a flow chart describing a process 600 for performing client-side targeted advertisement replacement. The process is divided into two parts: manifest proxying in steps 602-620 and segment proxying in steps 652-666. The two processes could be used independently, or in conjunction with each other. Though advertisement placement requests are specified in both processes, if the two processes are used together, there is no need to issue two advertisement placement requests.

In the manifest proxying beginning at step 602, the manifest proxy 304 receives a manifest request from the media player 306. The manifest proxy 304 retrieves an updated manifest from the CDN 104 and parses out advertisement metadata inserted by the live stream processor 102. In step 604, a check is performed to see if a new advertisement start is indicated in the manifest. If a new advertisement start is indicated in step 604, processing proceeds to step 606 where the advertisement replacement flag is set, indicating to the manifest parser 302 that manifest rewrite should occur. Processing then proceeds to step 608. If a new advertisement start is not indicated, processing proceeds from step 604 directly to step 608.

In step 608, a check is performed to see if the end of the current advertisement is indicated in the manifest. If the advertisement end is indicated, processing proceeds to step 610 where the advertisement replacement flag is unset, indicating to the manifest parser 302 that manifest rewrite should stop. A beacon message is also sent to the ADS 108 to indicate completion of advertisement playback. Processing then proceeds to step 612. If the advertisement end is not indicated, processing proceeds from step 608 directly to step 612.

In step 612, a check is performed to see if an upcoming advertisement break is indicated in the manifest. If an upcoming advertisement break is indicated, processing proceeds to step 614 where an advertisement placement request is issued to the ADS 108. In one embodiment, the ADS 108 returns a manifest file or a URL pointing to a manifest file specifying the segments for the replacement advertisement. In another embodiment, the ADS 108 returns an advertisement media identifier used to look up the manifest and/or segment location information for the selected advertisement. The manifest is saved for future use in advertisement segment replacement. Processing then proceeds to step 616. If a new advertisement start is not indicated, processing proceeds from step 612 directly to step 616.

In step 616, a check is performed to see if advertisement replacement is currently in progress, per step 606. If advertisement replacement is active, processing proceeds to step 618 where manifest rewrite occurs. The manifest parser 302 selects the next sequential replacement advertisement segment and inserts its URL (along with any associated encryption key URL and/or encryption key metadata) into the manifest. Processing then proceeds to step 620. If a new advertisement start is not indicated, processing proceeds from step 616 directly to step 620. In step 620, the manifest is returned to the media player 306.

In the segment proxying beginning at step 652, the segment proxy 310 receives a segment request from the media player 306.

In step 654, a check is performed to see if the request is for the first segment of an advertisement. If the request is for the first segment of an advertisement, processing proceeds to step 656 where an advertisement placement request is issued to the ADS 108. In one embodiment, the ADS 108 returns a manifest file or a URL pointing to a manifest file specifying the segments for the replacement advertisement. In another embodiment, the ADS 108 returns an advertisement media identifier used to look up the manifest and/or segment location information for the selected advertisement. The manifest is saved for use in the replacement of subsequent advertisement segments for the selected advertisement. In one embodiment, the advertisement placement response and manifest file are cached for use in future advertisement replacement opportunities. The first segment of the replacement advertisement is selected and retrieved. Processing then proceeds to step 658. If the request is not for the first segment of an advertisement, processing proceeds from step 654 directly to step 658.

In step 658, a check is performed to see if the request is for the last segment of the current advertisement. If the request is for the last segment of the current advertisement, processing proceeds to step 660 where a beacon message is sent to the ADS 108 to indicate completion of advertisement playback. Processing then proceeds to step 662. If the request is now for the last segment of the current advertisement, processing proceeds from step 658 directly to step 662.

In step 662, a check is performed to see if advertisement replacement is currently in progress, per step 656. If advertisement replacement is active, processing proceeds to step 664 where the current replacement advertisement segment is returned to the media player 306. In one embodiment, the segment parser 308 decrypts the advertisement segment and re-encryptions the advertisement segment using the same encryption key as the live stream segment being replaced before sending it to the media player 306. If advertisement replacement is not active, processing proceeds from step 662 directly to step 666. In step 666, the requested stream segment is returned to the media player 306.

Figure 7A:
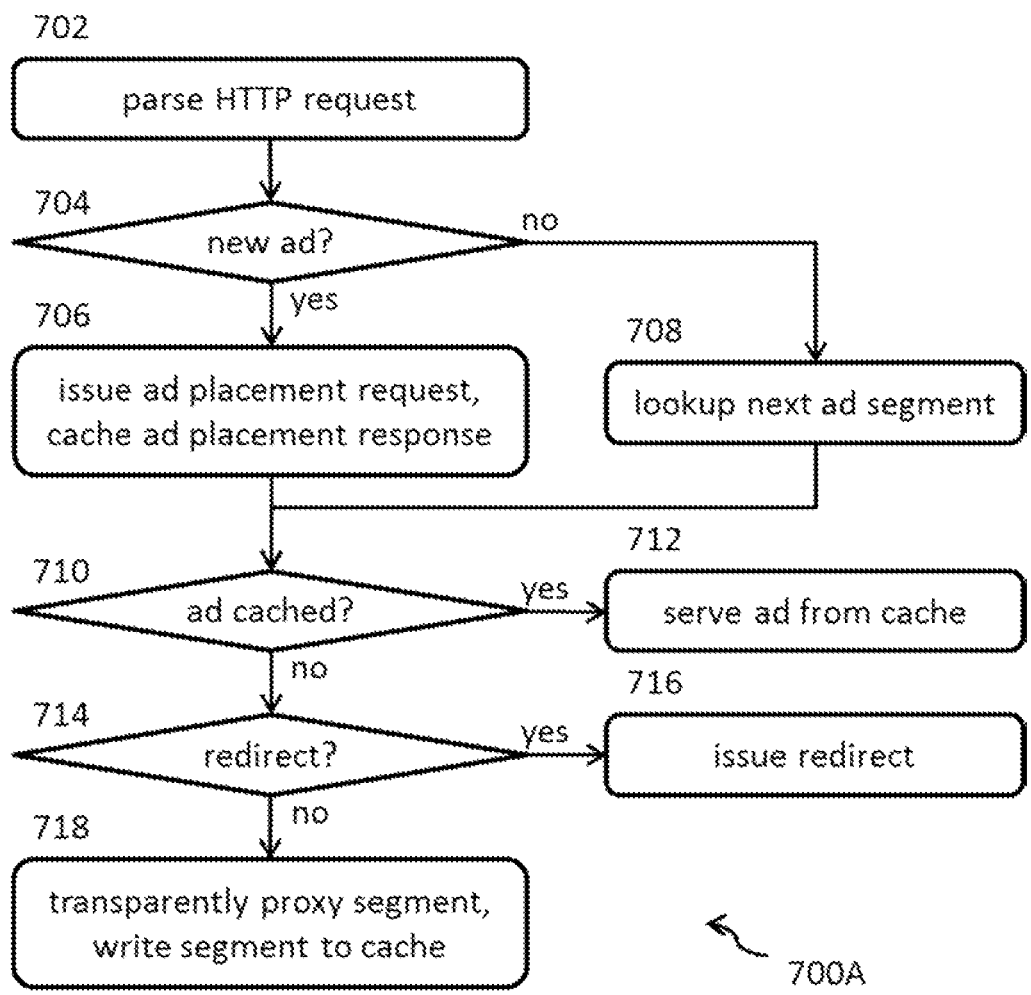
FIG. 7, consisting of parts 7A and 7B, is a flow chart showing a method for performing network proxy-based targeted advertisement replacement, in accordance with an embodiment of the present invention.
Figure 7B:
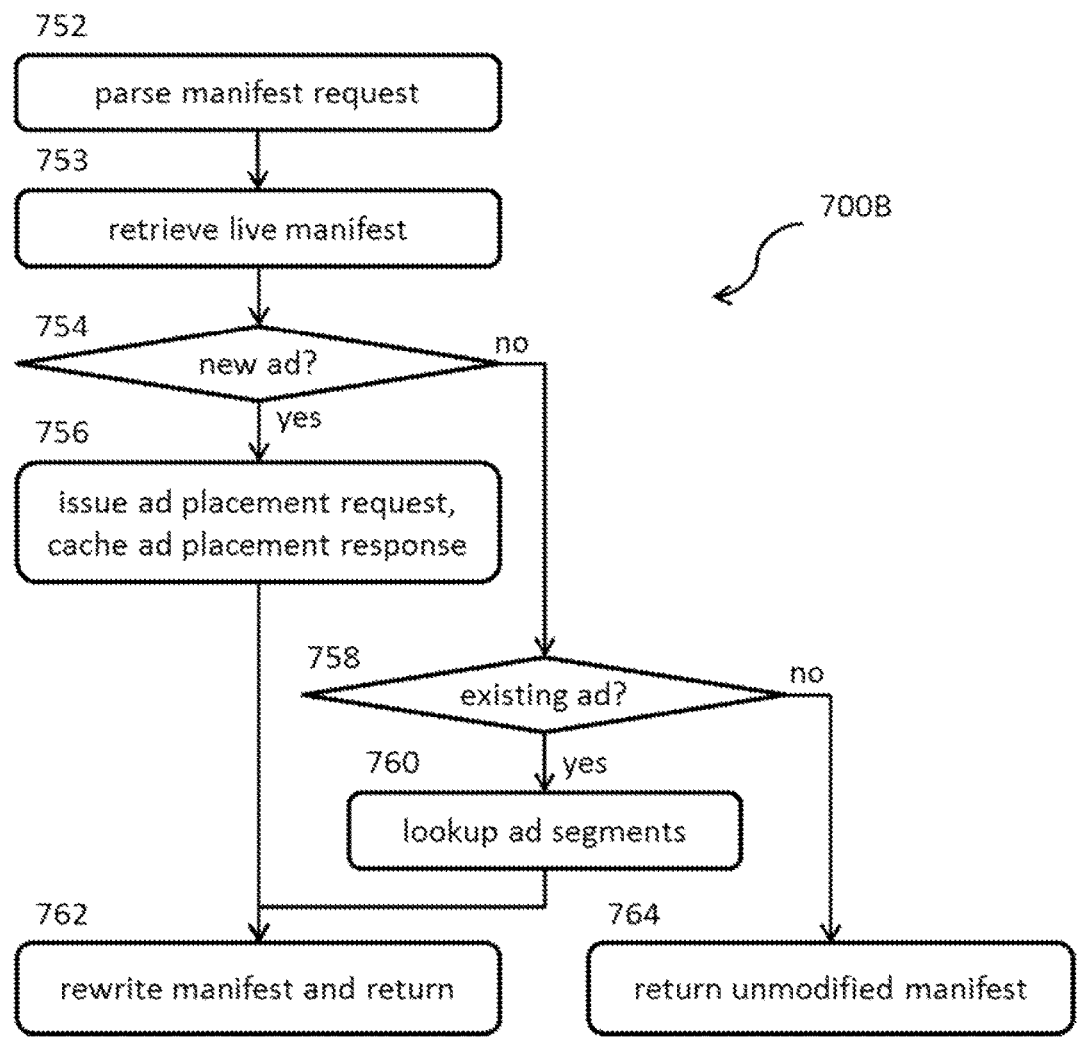

FIG. 7 is a flow chart describing processes of the network proxy 106 for performing network proxy-based targeted advertisement replacement. There are two sub-processes: segment proxying in sub-process 700A having steps 702-718 (FIG. 7A), and manifest proxying in sub-process 700B having steps 752-764 (FIG. 7B). The two processes could be used independently or in conjunction with each other. Though advertisement placement requests are specified in both processes, if the two processes are used together, there is no need to issue two advertisement placement requests.

Beginning with the segment proxying sub-process 700A, in step 702, the network proxy 106 receives and parses an advertisement segment request from the client 110. In step 704, a check is performed to see if this is the first segment of a new advertisement. If the request is for a new advertisement, processing proceeds to step 706 where advertisement metadata, including advertisement spot (placement), program identifier, original program broadcast time, advertisement placement restrictions, and program demographic information, as well as subscriber and/or user identity, location, and/or demographic information is extracted from the request. An advertisement placement request is then issued to the ADS 108. In one embodiment, the ADS 108 returns a manifest file or a URL pointing to a manifest file specifying the segments for the replacement advertisement. In another embodiment, the ADS 108 returns an advertisement media identifier used to look up the manifest and/or segment location information for the selected advertisement. The network proxy 106 stores the advertisement placement response as well as a mapping between the current client 110 advertisement request to the advertisement placement response so that subsequent advertisement segment requests may be properly mapped for continuation of the selected advertisement. In one embodiment, the advertisement placement response and manifest file are cached for use in future advertisement replacement opportunities. In step 704, if the request was not for a new advertisement, processing proceeds to step 708 where the client 110 advertisement request is mapped to a stored advertisement placement response, and the appropriate next segment is selected.

Once processing is complete in steps 706 or 708, processing proceeds to step 710, where the advertisement segment delivery begins. In step 710 a check is performed to see if the desired segment is cached locally. If the segment is cached locally, processing proceeds to step 712 where the segment is retrieved from the local cache 406 and delivered to the client 110. If the segment is not cached locally, processing proceeds from step 710 directly to step 714 where a check is performed to see if redirection is allowed. If redirection is allowed, processing proceeds to step 716 where the network proxy 106 issues an HTTP 302 redirect to the client 110, directing it to the location of the selected advertisement segment in the CDN 104. If redirection is not allowed, processing proceeds from step 714 directly to step 718 where the network proxy 106 begins retrieving the selected advertisement segment from the CDN 104 and transparently proxies it to the client 110. In one embodiment, the network proxy 106 decrypts the advertisement segment and re-encryptions the advertisement segment using the same encryption key as the live stream segment being replaced before sending it to the client 110. In one embodiment, the advertisement segment data is also stored locally in the cache 406.

Now turning to the manifest proxying sub-process 700B, in step 752, the network proxy 106 receives and parses a manifest request from the client 110. Processing then continues to step 753 where the network proxy 106 retrieves the current live stream manifest file from the CDN 104. In step 754, a check is performed to see if the most recent (newest) segment in the manifest is the first segment of a new advertisement. If the manifest contains the start of a new advertisement, processing proceeds to step 756 where advertisement metadata, including advertisement spot (placement), program identifier, original program broadcast time, advertisement placement restrictions, and program demographic information, as well as subscriber and/or user identity, location, and/or demographic information is extracted from the request. An advertisement placement request is then issued to the ADS 108. In one embodiment, the ADS 108 returns a manifest file or a URL pointing to a manifest file specifying the segments for the replacement advertisement. In another embodiment, the ADS 108 returns an advertisement media identifier used to look up the manifest and/or segment location information for the selected advertisement. The network proxy 106 stores the advertisement placement response as well as a mapping between the current client 110 advertisement request to the advertisement placement response so that subsequent advertisement segment requests may be properly mapped for continuation of the selected advertisement. In one embodiment, the advertisement placement response and manifest file are cached for use in future advertisement replacement opportunities. Once the advertisement information is retrieved, processing continues to step 762.

In step 754, if the manifest did not contain the start of a new advertisement, processing proceeds to step 758 where a check is performed to see if the manifest contains advertisement segments which are currently being replaced. If there are no advertisement segments in the manifest, processing continues to step 764 where the unmodified manifest is returned to the client 110. If advertisements segments other than just the first advertisement segment exist in the manifest in step 758, processing continues to step 760 where the replacement advertisement information is retrieved from the cache 406. Processing then continues on to step 762.

In step 762, the network proxy 106 replaces advertisement segment URLs in the live stream manifest with the replacement advertisement segment URLs (along with any associated encryption key URL and/or encryption key metadata) retrieved from the ADS 108 and returns the modified manifest file to the client 110.

Although the above description includes numerous specifics in the interest of a fully enabling teaching, it will be appreciated that the present invention can be realized in a variety of other manners and encompasses all implementations falling within the scope of the claims herein.

What is claimed is:

1. A method of operating a computer system for targeted advertisement replacement in a live content stream, comprising:
 detecting metadata indicating program boundaries in the live content stream;
 extracting advertisement decision server, program identifier, and/or advertisement spot information from the metadata;
 issuing an advertisement placement request to an advertisement decision server;
 including advertisement decision server, program identifier, and/or advertisement spot information in the advertisement placement request to the advertisement decision server;
 receiving and processing an advertisement placement response from the advertisement decision server, wherein the advertisement decision server response is cached locally for use in future advertisement replacement opportunities;
 determining advertisement program boundaries; and
 replacing stream advertisement asset segments of the live content stream with segments indicated in the advertisement placement response, wherein the segments indicated in the advertisement placement response are transparently proxied from a network proxy to the computer system.

2. The method of claim 1, wherein the advertisement placement request employs a protocol selected from SCTE-130, Video Ad Serving Template/Video Multiple Ad Playlist, and a non-standard protocol.

3. The method of claim 1, wherein the advertisement decision server, program identifier, and/or advertisement spot information are detected via inline metadata.

4. The method of claim 3, wherein the in-band metadata includes one or more of ID3 tags, non-standard frame types, and non-standard metadata headers.

5. The method of claim 1, wherein advertisement decision server, program identifier, and/or advertisement spot information are detected via manifest file metadata.

6. The method of claim 5, wherein the metadata includes one or more of HLS m3u8 comments and DASH MPD tags/comments.

7. The method of claim 1, wherein the advertisement decision server, program identifier, and/or advertisement spot information detected via segment URL metadata, e.g., appended as part of the query string.

8. The method of claim 1, wherein subscriber identity, location, and/or demographic information are detected via segment URL metadata, e.g., appended as part of the query string.

9. The method of claim 8, further comprising: providing subscriber identity, location, and/or demographic information to the advertisement decision server to enable advertisement personalization.

10. The method of claim 1, further comprising: modifying advertisement segment requests to append subscriber identity, location, and/or demographic information to segment request URLs.

11. The method of claim 1, further including sending beacon messages reporting on completed advertisement playback.

12. The method of claim 1, further comprising: determining upcoming advertisement program boundaries, advertisement program start boundaries, and advertisement program end boundaries.

13. The method of claim 12, wherein program boundaries are detected via in-band metadata.

14. The method of claim 13, wherein the in-band metadata includes one or more of ID3 tags, non-standard frame types, and non-standard metadata headers.

15. The method of claim 12, wherein program boundaries are detected via manifest file metadata.

16. The method of claim 15, wherein the manifest file metadata includes one or more of HLS m3u8 comments and DASH MPD tags/comments.

17. The method of claim 15, further comprising: transparently proxying and modifying the manifest file to append subscriber identity, location, and/or demographic information to segment URLs in the manifest file processed by the media player.

18. The method of claim 12, further including:
receiving a manifest request for a current live stream manifest file and retrieving the manifest file from a content delivery network;
determining whether the manifest file contains a start of a new advertisement or contains segments of an advertisement currently being replaced;
if the manifest file contains neither the start of a new advertisement nor segments of an advertisement currently being replaced, then responding to the manifest request with the manifest file unmodified;
if the manifest file contains the start of a new advertisement, then (i) extracting advertisement decision server, program identifier, and/or advertisement spot information from the manifest request, (ii) issuing an advertisement placement request to the advertisement decision server, (iii) receiving and processing the advertisement placement response from the advertisement decision server, and responding to the manifest request with a first modified manifest file including an advertisement asset specified in the advertisement placement response; and
if the manifest file contains segments of an advertisement currently being replaced, then (i) looking up segments of the advertisement currently being replaced, and (ii) responding to the manifest request with a second modified manifest file including the looked up segments.

19. The method of claim 18, wherein the advertisement decision server returns a manifest file or a URL pointing to a manifest file specifying the segments for the replacement advertisement.

20. The method of claim 18, wherein the advertisement decision server returns an advertisement media identifier used to look up the manifest and/or segment location information for the selected advertisement.

21. The method of claim 18, further including storing the advertisement placement response as well as a mapping between a current client advertisement request and the advertisement placement response so that subsequent advertisement segment requests may be properly mapped for continuation of a selected advertisement.

22. A computerized device operable as a client or an ad segment proxy in a content delivery system, comprising:
memory storing computer program instructions;
one or more processors for executing the instructions;
input/output (I/O) circuitry connecting the computerized device to external devices; and
interconnect circuitry connecting the memory, processor(s) and I/O circuitry together,
wherein the computer program instructions are operative when executed by the processor(s) to cause the computerized device to perform a method of processing a live content stream including:
detecting metadata indicating program boundaries in the live content stream;
extracting advertisement decision server, program identifier, and/or advertisement spot information from the metadata;
issuing an advertisement placement request to an advertisement decision server;
including advertisement decision server, program identifier, and/or advertisement spot information in the advertisement placement request to the advertisement decision server;
receiving and processing the advertisement placement response from the advertisement decision server,
wherein the advertisement decision server response is cached locally for use in future advertisement replacement opportunities;
determining advertisement program boundaries; and
replacing stream advertisement asset segments of the live content stream with segments indicated in the advertisement placement response, wherein the segments indicated in the advertisement placement response are transparently proxied from a network proxy to the computerized device.

23. The computerized device of claim 22, wherein the method performed by execution of the computer program instructions further includes retrieving and returning to the client media player advertisement segments from a remote server specified in the advertisement placement response.

24. The computerized device of claim 22, wherein the method performed by execution of the computer program instructions further includes redirecting the client media player to advertisement segments on remote server specified in the advertisement placement response.

25. The computerized device of claim 22, wherein the method performed by execution of the computer program instructions further includes determining upcoming advertisement program boundaries, advertisement program start boundaries, and advertisement program end boundaries.

26. The computerized device of claim 25, wherein the method performed by execution of the computer program instructions further includes:
  receiving a manifest request for a current live stream manifest file and retrieving the manifest file from a content delivery network;
  determining whether the manifest file contains a start of a new advertisement or contains segments of an advertisement currently being replaced;
  if the manifest file contains neither the start of a new advertisement nor segments of an advertisement currently being replaced, then responding to the manifest request with the manifest file unmodified;
  if the manifest file contains the start of a new advertisement, then (i) extracting advertisement decision server, program identifier, and/or advertisement spot information from the manifest request, (ii) issuing an advertisement placement request to the advertisement decision server, (iii) receiving and processing the advertisement placement response from the advertisement decision server, and responding to the manifest request with a first modified manifest file including an advertisement asset specified in the advertisement placement response; and
  if the manifest file contains segments of an advertisement currently being replaced, then (i) looking up segments of the advertisement currently being replaced, and (ii) responding to the manifest request with a second modified manifest file including the looked up segments.

* * * * *